US005129136A

United States Patent [19]

Richardson

[11] Patent Number: 5,129,136

[45] Date of Patent: Jul. 14, 1992

[54] FLANGE SPREADER

[76] Inventor: H. Gary Richardson, Rte. 1, Box 132C, Rodd Field, Corpus Christi, Tex. 78414

[21] Appl. No.: 673,342

[22] Filed: Mar. 22, 1991

[51] Int. Cl.[5] .............................................. B23P 19/04

[52] U.S. Cl. ..................................... 29/426.5; 29/239; 29/256; 29/252

[58] Field of Search ....................... 29/426.5, 239, 237, 29/256, 263, 264, 252

[56] References Cited

U.S. PATENT DOCUMENTS

| | | | |
|---|---|---|---|
| 3,997,957 | 12/1976 | Tone et al. | 29/239 |
| 4,027,373 | 6/1977 | Kwost | 29/239 |
| 4,610,064 | 9/1986 | Verstraeten | 29/239 |

*Primary Examiner*—Robert C. Watson
*Attorney, Agent, or Firm*—G. Turner Moller

[57] ABSTRACT

A flange spreading implement includes a set of pins freely slide into the bolt holes of the flanges to be spread apart. The pins are of a size selected to bind in the flange bolt holes upon the application of a moment to the pins. Arms are connected to the pins and extend beyond the periphery of the flanges to be spread. A force applier, such as a hydraulic motor or screw, is used to apply a force to the arms in a direction generally parallel to the axis of the flanges. This imparts a moment to the pins, causing them to bind in the bolt holes and thereby grip the flanges. The force applier applies sufficient force to spread the flanges apart to allow a valve, meter, flow treater, gasket, orifice plate or the like, to be removed from between the flanges.

27 Claims, 3 Drawing Sheets

FLANGE SPREADER

This invention relates to a device for separating or spreading the flanges of a pipe installation.

Pipelines, plants and refineries include welded pipe sections that are periodically interrupted by flanged valves, meters, or the like. The meter or valve includes complementary flanges and is positioned between and connected to the pipe flanges by a number of nut-bolt assemblies. There always comes a time when it is necessary to remove or replace the flanged meter or valve. The nuts and bolts are removed from the flanged connections. If the pipe is in tension or substantially unstressed, the flanged meter or valve simply falls out from between the flanged pipe ends. This often happens, but it also often happens that the pipe is in compression and the flanged meter or valve is wedged in place and will not drop out.

The pipe must be stressed to relieve the compression on the flanged meter or valve. One common inelegant technique is to attach chains to opposite sides of the flanged connection and pull on the chains with bulldozers. In some situations, the flanged connections have to be cut out with welding torches and welded back in place. After a few such episodes, people wonder why they use flanged connections rather than welded connections. It is thus understandable why special implements have been devised to spread the flanges of a flanged connection as shown in U.S. Pat. No. 4,027,373. For another device of some interest, see U.S. Pat. No. 2,316,306.

Another related situation involves removing or replacing a fairly slim component, such as a gasket or orifice plate, between abutting flanges. These situations differ from removing a flanged valve or meter because the flanges to be spread are close together rather than spaced apart by the length of the valve or meter. Devices to spread flanges to remove an orifice plate or gasket are in U.S. Pat. Nos. 3,107,419 and 4,015,324. It appears that no one has heretofore made a flange spreader which is easily modified to work in both situations.

Flanges are cylindrical plates having a centrally located welding neck on one side for welding to the adjacent end of a pipe section, valve or meter. The plates have an array of bolt holes or passages spaced about the circumference. Flanges are made in accordance with design specifications that were established years ago because compatibility is essential. The first problem with flange spreading implements is providing a simple, inexpensive, secure technique for grasping the flanges. Flanges do not have convenient places to grab onto to impart a spreading force. As shown in the prior art, flange spreaders have used the gap between facing flanges to grab onto as in the case of U.S. Pat. Nos. 3,107,419 and 4,027,373 and have used the flanges and the passages as shown in U.S Pat. No. 4,015,324. Using the gaps between facing flanges has a serious disadvantage because, in many flanged connections, the gap between the facing flanges is small, very often less than ⅛", which provides insufficient space for inserting a member strong enough to withstand the forces generated.

In this invention, the flange spreading implement grips the passages in a simple, elegant manner. A pin, only slightly smaller than the passage, is inserted into aligned ones of the passages. An arm, connected to and transverse to the pin, extends away from the passage, preferably beyond the circumference of the flange. A force applying device, such as a linear hydraulic motor or mechanical screw, is applied to the arms. When the force is initially applied, the pins cant slightly in the passage and thereby bind in the passage to allow a very large force to be applied—one which is sufficient to spread the flanges apart and allow the flanged valve, flanged meter, orifice plate or gasket to be removed and replaced. The only real difference, in this invention, between spreading flanges to remove a slim component and between spreading flanges to removed a flanged valve or meter is the distance between the arms to which the force applying device reacts against. In the case of spreading flanges to replace a gasket, the distance between the arms is small, so a short force applier, such as a screw is used. Where the arms are quite far apart, a linear hydraulic motor or much larger screw is preferred.

It is an object of this invention to provide an improved method and apparatus for spreading flanges.

Another object of this invention is to provide an improved method and apparatus for spreading flanges using pins extended into the bolt passages provided by the flanges for grasping onto the flanges.

These and other objects of this invention will become more fully apparent as this description proceeds, reference being made to the accompanying drawing and appended claims.

IN THE DRAWINGS

FIG. 1 a side view of a flanged connection incorporating a valve or meter, illustrating an implement of this invention in the process of spreading the flanges apart;

Figure 1:
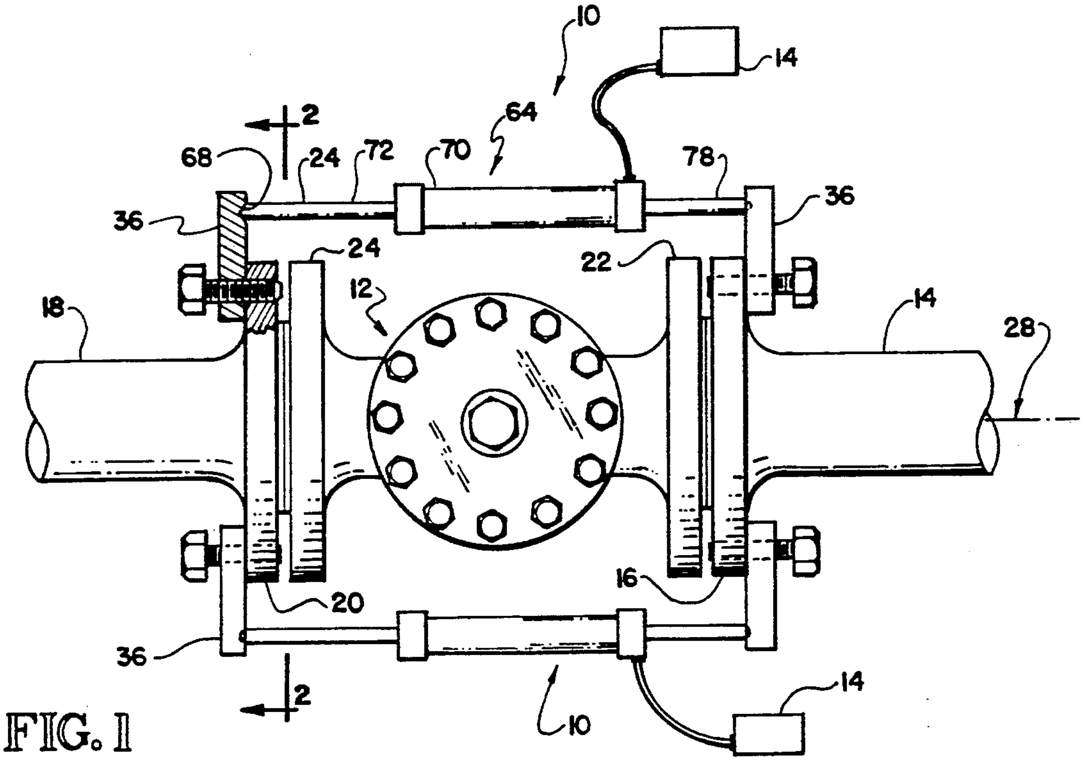
Figure 2:
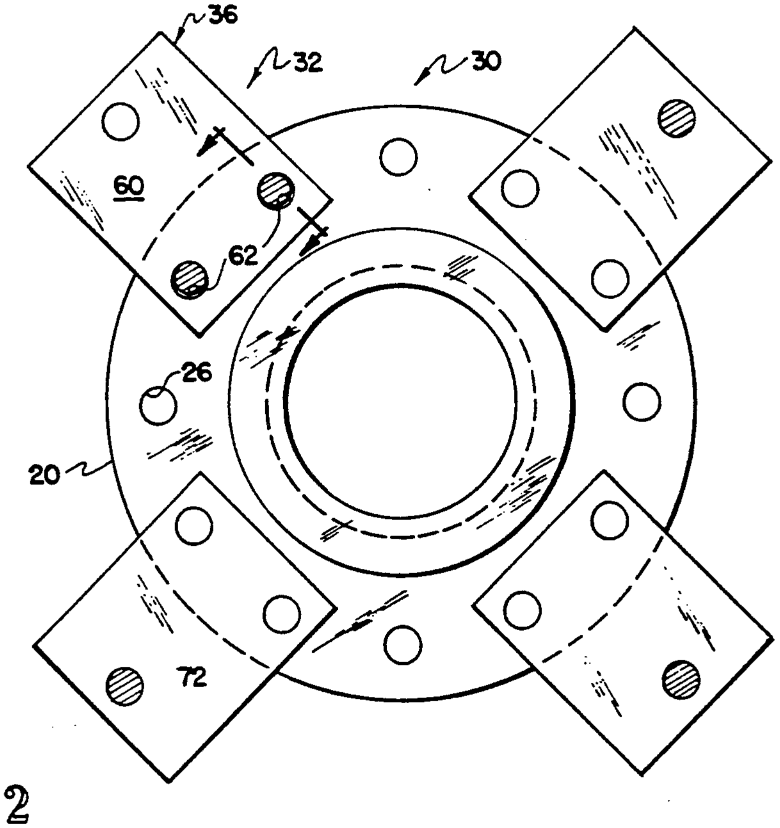
FIG. 2 is an cross-sectional view of the flanged connection of FIG. 1, taken along line 2—2 thereof as viewed in the direction indicated by the arrows.
Figure 3:
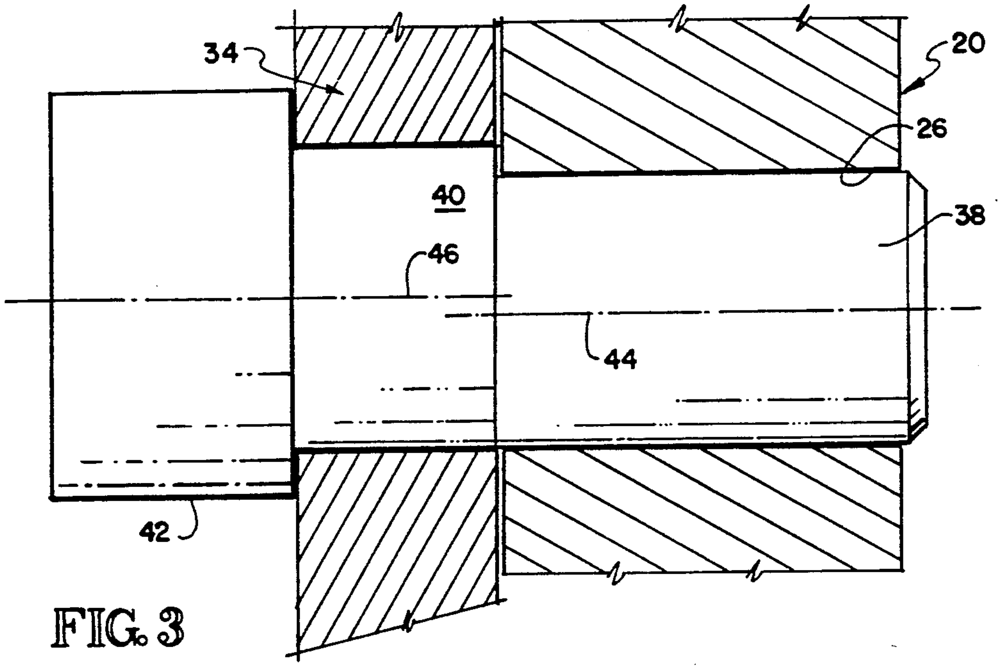
FIG. 3 is an enlarged cross-sectional view of FIG. 2, taken along line 3—3 thereof as viewed in the direction indicated by the arrows.

Referring to FIGS. 1-3, a conventional flanged installation 10 is illustrated as being spread apart to remove a flow device 12. As used herein, the term flow device is intended to mean any flow controlling, modifying, measuring or treating device which is installed in a pipe section to perform some function on the fluid therein contained. The installation 10 includes an inlet pipe section 14 having a flange 16 welded thereto, an output pipe section 18 having a flange 20 welded thereto and the flow device 12 having end flanges 22, 24 mating with the flanges 16, 18. The flanges 16, 18, 22, 24 are conventional and substantially identical, providing an array of aligned passages 26 symmetrically arranged in a circle about a central axis 28 of the flanges and receiving bolt-nut assemblies (not shown) to force the flanges together in a sealed relation. Those skilled in the art will recognize the installation 10 as typical of flanged connections used in pipelines, refineries, plants and the like.

As mentioned previously, it is often required to remove or replace the flow device 12. When the bolt-nut assemblies are removed from the flanged connection, any torque built up in the pipe line is relaxed. When the bolt-nut assemblies are relaxed, the flanges 16, 20, 22, 24 are watched to see if any movement occurs. When the primary axial stress is tension, the flanges 16, 20 move apart slightly from the flanges 22, 24 when the bolt-nut assemblies are relaxed. In this event, some type support is provided for the flow device 12 because it simply falls out from between the flanges 16, 20 when the bolt-nut assemblies are removed. On the other hand, if the primary axial stress is compression, nothing happens when the bolt-nut assemblies are relaxed and the flow device 12 remains wedged in place between the flanges 16, 20 after the assemblies are removed.

To spread the flanges 16, 20 apart, an implement 30 of this invention is assembled on the flanged connection. The implement 30 comprises a series of force transmitting assemblies 32 each of which includes a pair of pins 34 and an arm or plate 36. The pins 34 are shown best in FIG. 3 and comprise an end 38 received in the passage 26 of the flange, a shank 40 and a head 42. The centerline 44 of the end 38 is slightly offset, preferably about 1/16th inch in a 1¼ inch diameter pin, relative to the centerline 46 of the shank 40 for purposes more fully apparent hereinafter.

The external diameter of the pin end 38 is carefully selected relative to the size of the passage 26 to cause the pins 34 to bind in the passages 26 upon the application of force to the arms 36. The following table is helpful in determining the appropriate size of pins of cylindrical shape:

TABLE I

| (1) hole size, in | (2) undersized pin, in | (3) pin size, in | (4) hole area sq in | (5) pin size sq in | (6) (5)/(4) |
|---|---|---|---|---|---|
| 1.00 | .015 | .985 | .785 | .762 | .970 |
| 1.00 | .025 | .975 | .785 | .747 | .951 |
| 1.00 | .035 | .965 | .785 | .731 | .931 |
| 1.00 | .045 | .955 | .785 | .716 | .912 |
| 1.00 | .055 | .945 | .785 | .701 | .893 |
| 1.00 | .065 | .935 | .785 | .687 | .874 |
| 1.00 | .075 | .925 | .785 | .672 | .856 |
| 1.00 | .085 | .915 | .785 | .658 | .837 |
| 1.00 | .100 | .900 | .785 | .636 | .810 |
| 1.00 | .125 | .875 | .785 | .601 | .766 |
| 1.00 | .150 | .850 | .785 | .568 | .723 |
| 1.00 | .175 | .825 | .785 | .535 | .681 |
| 1.00 | .200 | .800 | .785 | .503 | .640 |
| 1.00 | .225 | .775 | .785 | .472 | .600 |
| 1.00 | .250 | .750 | .785 | .442 | .563 |

As a general rule, the closer the fit of the pin 38 is to the passage 26, the easier the pin 38 binds in the passage 26 and the more secure the connection. On the other hand, a certain tolerance is handy because not all passages 26 are going to be exactly the right size. It has been found that for a nominal 1.00" diameter passage, the pin size should be on the order of at least 0.900 inch diameter, meaning that there is not more than 0.100 inch tolerance between the pin and the passage. Preferably, there is not more than 0.035 inches tolerance in this situation and, ideally, there is about 0.015 inches tolerance. The ease in which the pin 38 binds in the passage 26 is perhaps more directly related to the ratio of the areas, as shown in column 6. Thus, for cylindrical pins, the area ratio should be at least 0.810, preferably about 0.93 and ideally about 0.970.

Figure 4:
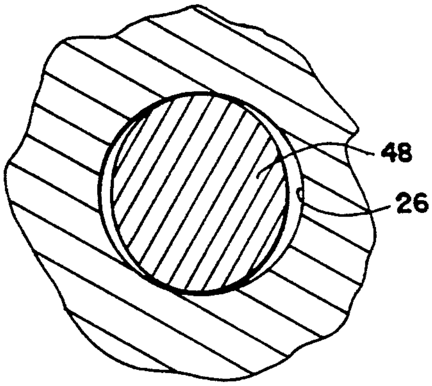
FIG. 4 is an enlarged cross-sectional view of another pin of this invention.

The situation is slightly different for pins of other than cylindrical shape. As shown in FIG. 4, a pin 48 of oval or elliptical shape is complicated by the necessity to orient the major diameter parallel to the plane of canting of the pin in the passage 26. When so oriented, the oval or elliptical pin 48 acts much like the cylindrical pin 38 having a diameter corresponding to the major diameter of the oval or elliptical pin 48. If the minor diameter of the pin 48 is oriented in the plane of canting of the pin in the passage 26, the oval or elliptical pin 48 acts more nearly as if it were a cylindrical pin of the smaller diameter. Thus, oval or elliptical pins are operative, but not desirable because of the complexities of making the pins and of orienting them in the passages. If it is necessary or desirable to use oval or elliptical pins, the large dimension or major diameter should be about the same as diameter of a cylindrical pin, as discussed above.

Figure 5:
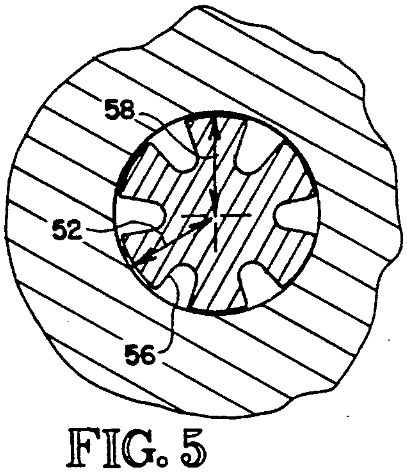
FIG. 5 is an enlarged cross-sectional view of another pin of this invention.

Pins of strict regular polygonal shape are not desirable because the pins contact the passages 26 only at the apices. Thus, the contact area between the pins and the passages 26 is very small so the material of the pin fails at the apices. This is easily corrected by using a pin 50 having flattened apices which may also be described as a scalloped cylinder as shown in FIG. 5. For pins of this shape, the maximum dimension is defined as the distance 52 from the center 54 of the pin 50 to one of the lobes 56 plus the distance 58 from the center 54 to another of the lobes 56. The maximum dimension should be about the same as the acceptable diameter of the cylindrical pin 38, as mentioned above.

The surface finish of the pins 38, 48, 50 may vary widely. A smooth exterior finish, as occurs when simply machining a cylindrical pin, works quite satisfactorily. Knurling or otherwise providing a relatively shallow finish on the exterior of the pins 38, 48, 50 also works acceptably although the knurling will be seen to ultimately flatten during use. Providing threads or partial threads on the exterior of the pins 38, 48, 50 also works acceptably. It is thus apparent that operation of this invention does not particularly depend on frictional contact between the pin and passage but instead depends more on the geometry of the pin and passage where the pin cants or binds in the passage.

Each arm or plate 36 comprises a relatively thick structural member 60 having interiorly smooth passages 62 spaced apart to match the spacing of the passages 26 in the flange 20. The size of the passages 62 are selected to bind on the shank 40 so, in an unstressed condition, the arm 36 may be moved axially toward and away from the flange 20 to accommodate any slight misalignment. The function of the offset centerlines 44, 46 should now be apparent. If the spacing between the passages 26 is slightly off relative to the passages 62, the pins 34 may be rotated about the centerline 46, which is the centerline of the passage 62, to thereby orient the pin 38 for alignment with the passages 26. The arms 36 also include means for connection to a force applier 64 such as a linear hydraulic motor 64, FIG. 1, or a mechanical screw 66, FIG. 6. Although this connection may be of any suitable type, a simple conical dimple or dimples 68 in the structural member 60 is quite satisfactory.

The linear hydraulic motor 64 is a conventional portable hydraulic motor having a cylinder 70, a piston rod 72 extendible out of one end of the cylinder 70, a source of hydraulic pressure 74 connected to the cylinder 70 by a hose 76, and an extension 78 threaded into the end of the cylinder 70. Interchangeable extensions of several lengths are preferably provided to allow the motor 64 to be configured to fit between flanges that are spaced apart at different distances. The extensions 78 provide a conical shaped end to be received in the dimples 68 of the arms 36. Those skilled in the art will recognize the motor 64 as a typical portable hydraulic motor.

Use of the implement 30 of this invention should now be apparent. After the bolt-nut assemblies (not shown) holding the flanges 16, 22, 20, 24 together are removed, the flanged flow device 12 either is easily removed or the implement of this invention is used. The arms 36 are placed over the desired passages 26 as shown in FIG. 2 and the pins 34 inserted through the aligned passages 62, 26. If a particular pair of passages 62, 26 are not exactly aligned, the pin 34 is rotated slightly about the axis 46 to allow the pin end 38 to pass into the passage 26 as shown in FIG. 3. The pin end 38 may extend slightly beyond the end of the passage 26 but should not extend so far it interferes with the end of the pin facing it. The user pushes the arm 36 toward the flange as close as it will go. The hydraulic motor 64 is then placed between the arms 32 and the piston 72 extended until the assembly is rigid. Another set of the pins 34, arms 36 and motor 64 is assembled around the periphery of the flange as suggested in FIG. 2. An important feature of this invention is that the components of the implement 30 between the flanges 22, 24, in the intended direction of removal of the flow device 12, are spaced outside the periphery of these flanges so the flow device can be moved without contacting or interfering with the implement 30. In the illustration of FIG. 2, all of the motors 64 lie outside the circumference of the flange 20, so the flow device 12 could be moved from between the flanges 16, 20 either up or down. It will be apparent that the implement 30 could be oriented so the flow device 12 could be moved in an inclined path.

After all of the pins 34, arms 36 and motors 64 are assembled, the user manipulates the source of hydraulic pressure 74 so the motors 64 apply a force to the arms 36 which is parallel to the axis 28. This applies a torque or moment to the pins 34 which causes them to cant or tilt in the passages 26. Because the tolerances between the pins 34 and passages 26 ar rather close, the pins 34 bind in the passages 26 rather than move axially out of the passages. Thus, the implement 30 of this invention grasp the flanges of the flanged installation 10 and spread the flanges 16, 20 apart so the flow device 12 can be readily removed.

Figure 6:
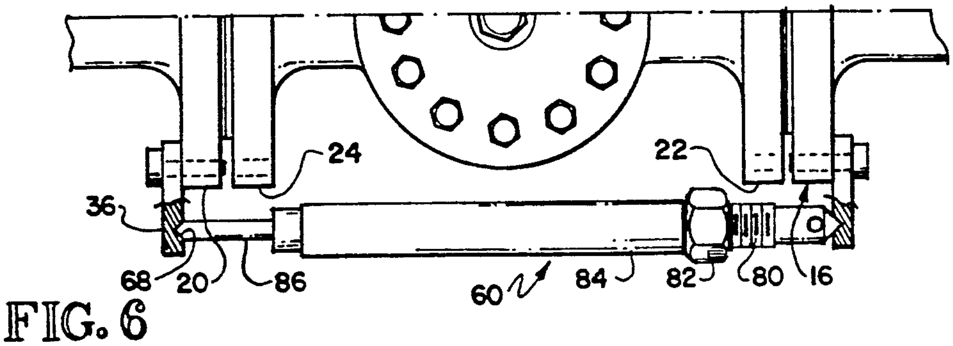
FIG. 6 is a side view of one embodiment of a force applying device of this invention.

Referring to FIG. 6, the screw 66 comprises a threaded rod 80 having a pointed end for positioning in the dimple 68, a nut 82 received on the threaded rod 80, a shaft 84 abutting the nut 82 and carrying a pointed end 86. The threaded rod 80 is slidably received in the shaft 84 thereby allowing a good deal of telescoping movement of the rod 80 relative to the shaft 84.

Figure 7:
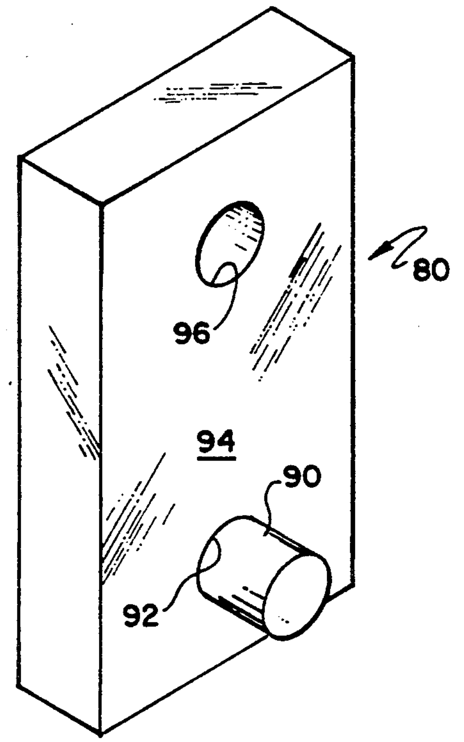
FIG. 7 is an isometric view of another embodiment of this invention.

Referring to FIG. 7, there is illustrated a simplified version of a force transmitting assembly 88 of this invention. The assembly 88 comprises a pin 90 of the appropriate diameter threaded or press fit into an opening 92 at one end of an arm 94 having a dimple 96 at the other end. It will be appreciated that the assembly 88 is used when the load applied to the flanged installation 10 is not to great. The assembly 88 has the advantage of fitting any flange in which the bolt hole size is appropriate for the pin 90. Thus, a half dozen sized assemblies 88 will fit almost any flanged connection. Because the passages 26 of flanges of different pressure rating are spaced apart at different distances, quite a large number of plates 36 are required to fit all possible flange sizes and ratings. Although a pair of plates can be made to pivot relative to one another, and thereby vary the distance between the openings 62, to provide an arm that will fit a large number of flanges of different capacity, the resultant devices are awkward, potentially dangerous and require more experienced personnel to work the implement satisfactorily.

Figure 8:
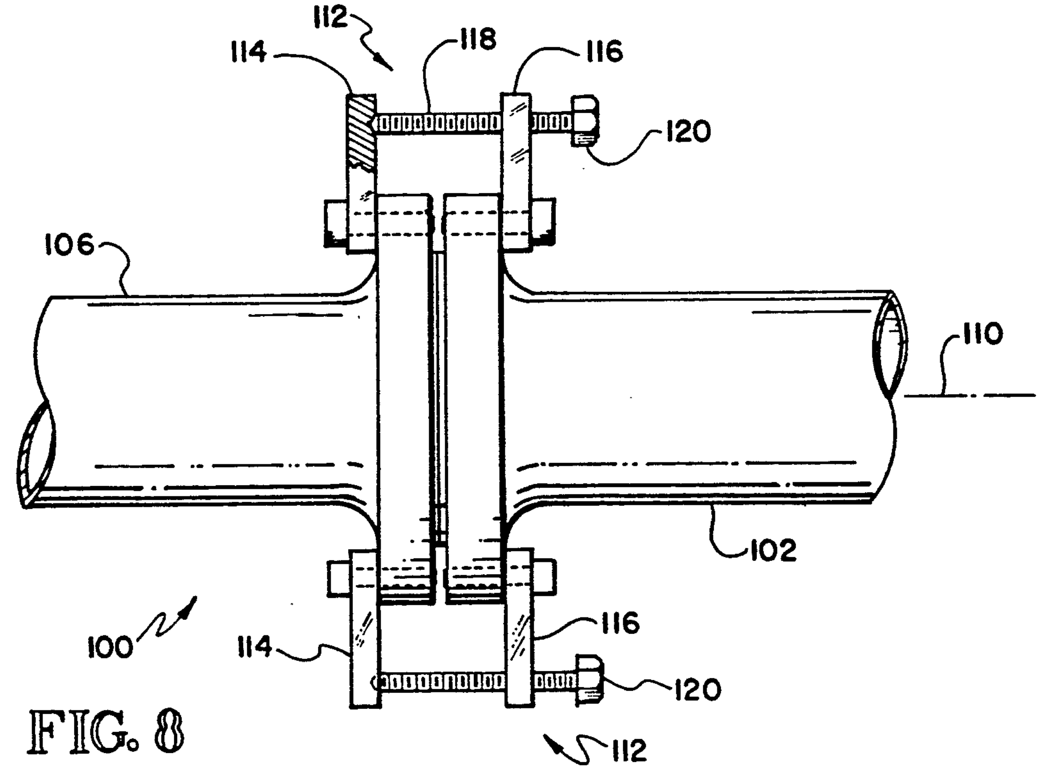
FIG. 8, is a side view of another flanged connection illustrating a slightly different implement of this invention in the process of spreading the flanges apart.

Referring to FIG. 8, a conventional flanged installation 100 is illustrated as being spread apart to remove a slim component, such as a gasket or orifice plate. The installation 100 includes an inlet pipe section 102 having a flange 104 welded thereto, an output pipe section 106 having a flange 108 welded thereto and a slim component (not shown) sandwiched and sealed between the flanges 104, 108. The flanges 104, 108 are conventional and substantially identical, providing an array of aligned passages (not shown) symmetrically arranged in a circle about a central axis 110 of the flanges and receiving bolt-nut assemblies (not shown) to force the flanges together in a sealed relation. Those skilled in the art will recognize the installation 100 as typical of flanged orifice plate installations.

To spread the flange 104, 108 apart, an implement 112 of this invention is provided. The implement 112 includes a force transmitting assembly 114, which may be either the assembly 32 or the assembly 88, and a force transmitting assembly 116 which has been modified to provide a threaded opening to receive a screw 118 having a head 120 thereon. The screw head 120 is simply turned with a wrench to force the arms of the force transmitting assemblies 114, 116 apart to bind the pins in the bolt holes or passages provided by the flanges 104, 108.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A method of axially spreading a joint having oppositely extending pipe sections including first and second flanged ends larger than the pipe and each providing a circular array of smooth bore passages therethrough each having a axis generally parallel to the pipe line, and a series of nut-bolt assemblies extending through the passages and connecting the joint together, the method comprising removing the nut-bolt assemblies from the passages;

inserting pins into selected aligned ones of the passages and providing first and second ends on opposite sides of the joint;

attaching first and second transverse arms to the first and second pin ends; and forcing the first and second arms apart and canting the pins relative to the axes for binding the pins in the passages and thereby moving the first and second flanges apart.

2. The method of claim 1 wherein the first and second flanges abut and the nut-bolt assemblies connect the first and second flanges together.

3. The method of claim 1 wherein the first and second flanges are separated by a flanged flow device having a third flange abutting the first flange and a fourth flange abutting the second flange, the third and fourth flanges having a circular array of smooth bore passages aligned with the passages of the first and second flanges, and wherein the pins are inserted in aligned ones of the openings.

4. The method of claim 1 wherein the inserting step comprises axially sliding the pin into the passage without substantial rotation.

5. The method of claim 1 wherein the passages are substantially cylindrical having an internal diameter and an axis therethrough generally parallel to the pipe and the pins have a maximum dimension at least 90% of the internal diameter of the passage.

6. The method of claim 1 wherein the passages provide an axial length parallel to the axis and the inserting step comprises inserting the pins through less than all of the axial length of the selected passages.

7. The method of claim wherein the first arm provides an unthreaded opening therethrough and the step of attaching the first arm to the first pin comprises forcing the first arm away from the second arm and canting the first pin in the first arm opening for binding the first pin in the first arm opening.

8. In combination, a joint having oppositely extending pipe sections including first and second flanges larger than the pipe and each providing a circular array of generally cylindrical smooth bore passages therethrough each having a axis generally parallel to the pipe sections, and an implement for spreading the flanges apart including

- a pair of pins extending into aligned ones of the smooth bore passages;
- an arm on each of the pins extending away from the axis; and
- means for forcing the arms apart, canting the pins in the passages relative to the passage axis and binding the pins in the passages and thereby moving the first and second flanges apart.

9. The combination of claim 8 wherein the first and second flanges abut.

10. The combination of claim 8 wherein the first and second flanges are separated by a flanged component having a third flange abutting the first flange and a fourth flange abutting the second flange, the third and fourth flanges having a circular array of smooth bore passages aligned with the passages of the first and second flanges and the pins reside in the passages of the first and second flanges.

11. The combination of claim 8 wherein the pin provides an externally smooth surface.

12. The combination of claim 8 wherein the passages are substantially cylindrical, provide an internal diameter and extend generally parallel to the pipe sections and the pins provide a maximum dimension at least 90% of the diameter of the passages.

13. The combination of claim 12 wherein the maximum dimension of the pins are at least 95% of the diameter of the passages.

14. The combination of claim 13 wherein the pins provide a smooth exterior surface.

15. The combination of claim 13 wherein the pins are cylindrical.

16. The combination of claim 13 wherein the pins are oval.

17. The combination of claim 13 wherein the pins are of scalloped circular cross-section.

18. The combination of claim 8 wherein the passage provide an axial length parallel to the axis and the pins extend through less than all of the axial length of the selected passages.

19. The combination of claim 8 wherein each of the arms provides an unthreaded opening therethrough and each of the pins extends through the unthreaded opening and the means forcing the arms apart comprises means for forcing a first of the arms away from a second of the arms and canting the pins in the arm openings for binding the pins in the arm openings.

20. An implement for spreading flanges of a flanged pipe connection of the type including oppositely extending pipe sections having first and second flanges larger than the pipe sections and each providing a circular array of generally cylindrical smooth bore passages therethrough each having a axis generally parallel to the pipe sections, the implement comprising

- a pair of pins for extending into aligned ones of the smooth bore passages;
- an arm on each of the pins extending transversely away from the pins; and
- means for forcing the arms apart, canting the pins in the passages relative to the passage axis and binding the pins in the passages and thereby moving the first and second flanges apart.

21. The implement of claim 20 wherein each of the arms provides an unthreaded opening therethrough and each of the pins extends through the unthreaded opening and the means forcing the arms apart comprises means for forcing a first of the arms away from a second of the arms and canting the pins in the arm openings for binding the pins in the arm openings.

22. The implement of claim 20 wherein the pin provides an externally smooth surface.

23. The implement of claim 20 wherein the maximum dimension of the pins are at least 95% of the diameter of the passages.

24. The implement of claim 23 wherein the pins provide a smooth exterior surface.

25. The combination of claim 23 wherein the pins are cylindrical.

26. The combination of claim 23 wherein the pins are oval.

27. The combination of claim 23 wherein the pins are of scalloped circular cross-section.

* * * * *